Patented Mar. 10, 1936

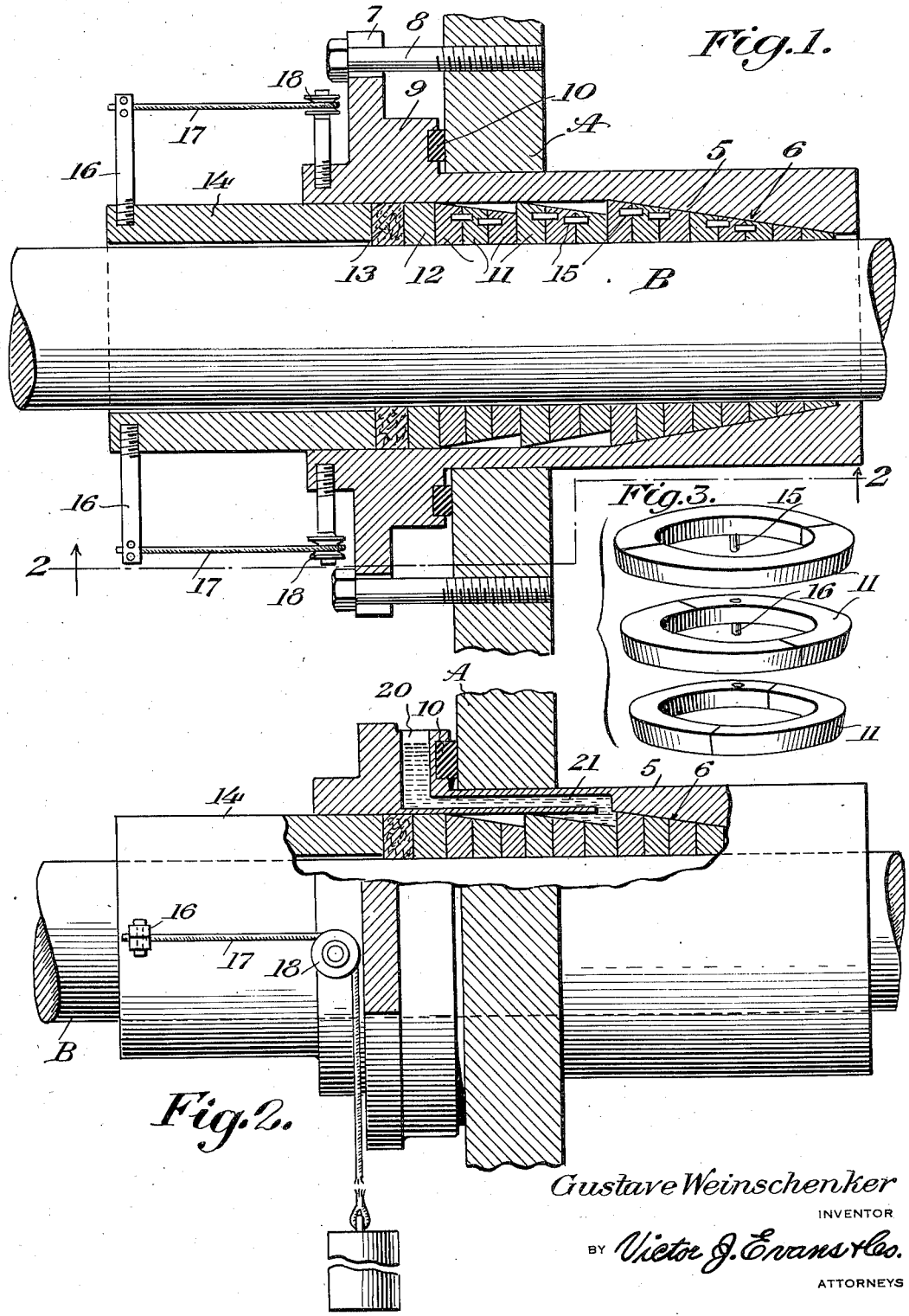

2,033,796

UNITED STATES PATENT OFFICE 2,033,796

METALLIC PACKING

Gustave Weinschenker, Blairsville, Pa.

Application September 6, 1934, Serial No. 742,985

1 Claim. (Cl. 286—32)

The invention relates to a metallic packing for rotary shafts and more especially to a combination metallic packing and stuffing box.

The primary object of the invention is the provision of a packing of this character, wherein the same is self-adjusting, easy to install, very sensitive and always perfect in its operation and seal.

Another object of the invention is the provision of a packing of this character, wherein the packing rings when becoming worn will dissipate through the inner end of the stuffing box and the same be replaced by fresh rings which are arranged within the stuffing box for automatic feeding toward the inner end of said stuffing box, the packing being constantly subjected to lubrication or oil and the packing affording a seal to a rotary shaft when in motion clockwise or counterclockwise and assuring a seal against oil, water, gas, steam, ammonia or any fluids, the packing rings being readily placed for renewal purposes and the packing assuring against leakage about the shaft.

A further object of the invention is the provision of a packing of this character which is simple in construction, thoroughly reliable and efficient in its purposes, easy to install, possessed of long life, easy of access and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a fragmentary elevation of a rotary shaft showing in section a stuffing box and packing constructed in accordance with the invention.

Figure 2 is a sectional view on the line 2—2 of Figure 1 looking in the direction of the arrows.

Figure 3 is a perspective exploded view of a group of packing rings as employed in the stuffing box.

Similar reference characters indicate corresponding parts throughout the several views in the drawing.

Referring to the drawing in detail, A designates a portion of a head of a chest or cylinder and B a portion of a rotary shaft working within the same. This chest or cylinder A has fitted therein and about the shaft B a stuffing box 5, the packing space therein being formed with the tapered inner end 6. The stuffing box 5, at the outer end thereof, is provided with the oppositely disposed ears 7 through which pass fasteners 8, these being engaged in the chest or cylinder A for the securing of the box in place. The outer end of the box 5 is shouldered, at 9, and has countersunk therein a gasket 10 which plays against the outer face of the cylinder circumferentially of the opening receiving the stuffing box 5 to provide a fluid seal between the stuffing box and said chest or cylinder.

Contained within the stuffing box 5 is a packing comprising a plurality of sectional rings 11, a soft metal ring 12 and a felt washer 13, respectively, the soft metal ring being disposed against the outermost of the sectional rings 11, while the felt washer 13 is disposed against the said ring 12, these, namely, the soft metal ring 12 and washer 13, being outermost in the stuffing box.

The sectional rings 11 are of like formation, each comprising at least two sections which, when assembled, are retained in place under the action of a sleeve-like sliding gland 14 telescoped in the outer end of the stuffing box 5 and encircling the shaft B, the sleeve being at its inner diameter of slightly greater size than the cross-sectional diameter of the shaft B, so that the latter will not contact with the inner surface of said gland in the working of the packing.

The sectional rings are disposed to break joint and are held in relative given positions by means of dowel pins 15 which project from the side of one ring and enter openings in the opposing side of the adjacent ring. It is preferable to have the series of rings 11 of conical formation so that as the innermost rings of the series wear, the same will become dissipated through the inner end of the stuffing box 5, the succeeding rings from the outermost ends of said stuffing box being automatically substituted or delivered for taking the place of the worn rings as the same are dissipated.

The rings 11 are preferably made from metal although the same may be made from any suitable material which is adapted to resist heat and wear while at the same time preserving an inherent resiliency which is essential in self-adjusting metallic packings. The packing rings 11 are comparatively thick. The sectional formation of the rings 11 permits convenient placement of new rings in the stuffing box 5 when the occasion requires.

The slidable gland 14 which encircles the shaft B carries diametrically opposed arms 16 to which are attached the terminals of a pair of cables 17, these being trained over guide pulleys 18 journaled upon the stuffing box 5 at its outer end and being diametrically opposite each other, the opposite ends of said cables being fitted with weights 19 of sufficient size to effect a pressure necessary by the gland 14 upon the packing within the stuffing box 5, to assure a seal about the shaft B, as should be obvious. The weights 19 with the cables 17 will effect a self-adjustment of the packing.

Provided within the stuffing box 5 and accessible at the outer end thereof is an oil well or cup 20 having the lead 21 opening into the space for the packing within the stuffing box 5 and this well, when filled with oil, will assure to the packing an oil supply that will constantly flood the packing so that the same is assured of maximum life.

The shaft B whether rotating clockwise or counterclockwise will be sealed so as to prevent fluid escaping about the same from the chest or cylinder A, as should be obvious.

The packing in the stuffing box 5 is readily accessible and in fact the entire assembly is such as to enable easy installation or removal as the occasion may require.

What is claimed is:

A self adjusting stuffing box, comprising, in combination, a cylindrical body having an outer shoulder to contact a support through which the body passes and to which the body is fixedly secured, and said body having a round shaft receiving passage which is inwardly tapered at one end thereof and which passage has arranged therein groups of tapered packing rings superimposed one on the other with the innermost group entirely filling the tapered portion of said passage, a shaft in said passage encircled by the rings, a soft metal ring superimposed upon the groups of packing rings and about said shaft, a felt washer carried by said metal ring, a slidable gland around the shaft received in the stuffing box and contacting the felt washer, opposed arms on the outer portion of the gland, opposed grooved rollers journaled on the body, weight carrying cables trained over the rollers and secured to the arms for influencing the gland to compress the washer and packing rings, the shoulder of the body having an oil well therein and the body having a lead for directing oil from the well into the bore of the body and said lubricating oil being retained in the bore by the compressed felt washer.

GUSTAVE WEINSCHENKER.